United States Patent Office 2,789,949
Patented Apr. 23, 1957

2,789,949
DRILLING FLUID

Clarence B. Scotty, Bellaire, Tex., assignor to The Texas Company, New York, N. Y., a corporation of Delaware No Drawing. Application August 30, 1955,
Serial No. 531,585

18 Claims. (Cl. 252—8.5)

This invention relates to aqueous or water-base drilling fluids and more particularly to those fluids of the so-called "lime base" type.

Drilling fluids or muds as they are sometimes called are used in the drilling of wells for tapping underground collections of oil, gas, brine, or water. Such fluids have a number of different functions, the most important of which are to assist in the removal of cuttings from the well, to seal off formations of gas, oil, or water which may be encountered at different levels, to lubricate the drilling tool and drill pipe which carries the tool, and to hold the cuttings in suspension in event of shut-downs in drilling.

An ideal drilling fluid is a thixotropic colloidal system, i. e., a fluid which on agitation or circulation as by pumping or otherwise, has a relatively low viscosity and is free flowing but when such agitation or circulation is halted, the fluid sets or gels. The rate of gel formation is such as to permit the cuttings to fall only a short distance before the gel structure is sufficiently strong to support them.

When such a drilling fluid having the proper viscosity, the proper gel rate and proper gel strength is circulated through a well bore, it has a sufficiently high viscosity to carry the cuttings and sand from the bottom of the hole to the surface and it has a gel rate such as to allow the cuttings and sand to settle in a settling pit. On standing in a quiescent state, it develops sufficient gel strength to prevent the settling of the cuttings, sand or weighting material, etc., in the well bore when it becomes necessary to discontinue circulation for any appreciable period of time. Such a fluid is also characterized by its ability to form a mud cake on the bore hole wall, thereby assisting in sealing off the traversed formations and inhibiting so-called water loss, i. e., loss of water from the drilling fluid.

The use of drilling fluids differing from that above described is attended by many disadvantages, all of which are well known to those skilled in the art. Such fluids develop no gel structure or develop strong gel structures so rapidly as to remain in an undesirable plastic state while in motion. The first condition results in the settling of suspended solids at the bottom of the bore hole during periods of discontinued circulation. The second condition results in a drilling fluid which is difficult to maintain free of cuttings and sand. Such a drilling fluid of adequate viscosity at normal circulation rate easily becomes gas-cut because of the recirculation of gas bubbles trapped by the rapidly-forming gels or flocks. This is particularly dangerous in cases where a bore hole traverses or encounters high gas pressures because the gas cutting of the fluid may so reduce the hydrostatic head of the drilling fluid in the bore hole as to result in the blowing-out of the well.

Drilling fluids are usually prepared by suspending clays in water, those clays being selected which will yield thixotropic colloidal systems. While such a drilling fluid may have all desired characteristics at the beginning of the drilling, these desirable properties are lost in varying degrees during the penetration of certain shales, clays, water-bearing formations, and other type formations. One serious form of deterioration of drilling fluids has been observed when drilling operations are conducted through or into marine shales which may be defined as shales deposited from fresh water suspensions by contact with sea water. In such cases there is a very rapid and extensive disintegration of the shale and immediate suspension of this shale in the drilling fluid which is a condition spoken of as "making mud." The addition of this extraneous clay or shale is attended by a rapid increase in viscosity and gel strength which is usually combatted by the addition of water. Where the drilling fluid contains appreciable quantities of weighting material such as barytes, this dilution of the drilling mud necessitates the adding of further quantities of weighting material to maintain the weight or the hydrostatic pressure of the mud column.

It is obvious that this condition results in waste of weighting material and components such as starch or deflocculating agents or other drilling fluid additives.

In an attempt to combat this condition, there have been developed within recent years so-called "lime base muds" which are prepared by suspending natural shales or clays in water, the alkalinity of which has been raised to a pH of 11.5 or above by the addition of sodium hydroxide. To this mixture there is then added calcium hydroxide, i. e., caustic lime, together with varying quantities of a stabilizing protective colloid such as quebracho. The theory underlying the use of these so-called lime muds is, that the marine shales containing as they do calcium, sodium, and potassium ions, are converted predominantly to the calcium saturated shales through base exchange with the aqueous phase of the lime base drilling fluid. Inasmuch as calcium saturated clays are less susceptible to colloidal disintegration, they are therefore stabilized by the use of such lime base drilling fluids.

For successful operation of a lime base drilling fluid, it is necessary to have sufficient lime to stabilize the shale. Lime added in excess of this quantity is undesirable because it exerts a strong flocculating action.

One function of the sodium hydroxide in the lime base muds is that of reducing the solubility of the caustic lime so as to prevent the flocculation of the drilling mud which would occur if a slight excess of the caustic lime were used alone. This critical lime requirement introduces many practical problems of control.

In overcoming the disadvantages of the prior practices, principally as respects the criticality of the lime addition, it is an object of this invention to provide a method wherein the desired alkaline earth metal ion such as the calcium ion can be supplied in the amount required without danger of any excessive and undesirable flocculation of the fluid.

A further object of the invention is the provision of a novel method of converting an alkali metal base drilling fluid to a so-called "lime base" drilling fluid by the use of alkaline earth metal compounds capable of providing any present requirements of the fluid for the alkaline earth metal ion and providing a reservoir for any subsequent requirements of the drilling fluid that may be occasioned by reason of different types of formations encountered in the drilling.

Other objects and advantages of the invention will appear from the following description and the attached claims.

The drilling fluid which I have discovered avoids the problem inherent in so-called lime base muds by automatically maintaining the proper amount of alkaline earth metal ion, preferably calcium, to saturate the shale without flocculating to excess.

Otherwise stated, the present invention may be described as involving the conversion of an alkali metal base mud to a so-called "lime base" mud by the addition under controlled conditions of an alkaline earth metal compound of a solubility such that an insufficiently high concentration of alkaline earth metal ions is provided to effect undesirable flocculation, while a reserve thereof is maintained in a relatively inert state and potentially available when required, the negative ion thereof being compatible with the drilling mud. Respecting compatibility of the negative ion, some compounds such as calcium sulphate are in the desired solubility range but the mud cannot tolerate the negative ion thereof. Other non-compatible anions are the chloride and nitrate ions. Hence, it is desirable to use only compounds characterized by negative ions that are compatible with the mud. Preferably, the alkaline earth metal compound is a calcium compound, such as calcium carbonate, as exemplified by ground oyster shell sometimes called "shell flour," having a solubility in the fluid when measured at 20° C. less than that of lime and more than that of calcium oxalate. While it is to be understood that alkaline earth metal compounds other than calcium compounds such as barium, magnesium, as exemplified by magnesium hydroxide, or strontium may be used, calcium compounds, preferably in the form of calcium carbonate, are preferred for their relative cheapness and availability in the form of ground oyster shell.

As an example of one method of practicing the invention, let it be assumed that a drilling mud has been prepared from clay and water, the usual weighting material added with starch and a thinner such as quebracho. In conventional practice, the conversion to a so-called lime base mud would be effected by the addition of lime, the amount thereof being determined as carefully as possible by pilot tests. However, as previously pointed out, the amount of lime is critical and an underdosage or an overdosage will result in an unsatisfactory fluid.

In practicing the present invention, if the mud is not alkaline, that is at a pH greater than 7, sufficient caustic is added to adjust the pH thereof the required amount and to maintain the mud alkaline, preferably at a pH of less than about 9.4, and calcium carbonate, as in the form of ground oyster shells, preferably having a particle size distribution of 80% through 325 mesh screen and the balance through 260 mesh screen, is added in an amount in excess of that theoretically required to convert the mud. Preferably, a small amount of quebracho is added with the carbonate. By reason of the relatively slight solubility of the carbonate as compared to that of lime, the advantages of lime are obtained without any of the disadvantages of control. Apparently, the solubility of a calcium compound having a solubility less than that of lime but more than that of calcium oxalate is such that it will react with the clays or shales present in the mud to reduce the viscosity and gel and prevent undesirable colloidal action of generating mud. It would appear that due to the limited solubility of the calcium compound, a large excess may be added to the mud initially, thus maintaining a relatively inert but potential supply of calcium ions which is sufficient to meet any condition that may be encountered in continued drilling through different formations.

In recent developments wherein it has been found advantageous to use a so-called "lime base" mud without starch to avoid excessive amounts of colloidal action and to combat caving of shale during drilling operations, it has been found necessary to maintain a high pH to control the lime solubility, this being a step also requiring accurate control. With the use of an alkaline earth metal compound as herein described as a replacement for lime, the necessity for this excessively high pH and the control problem is substantially eliminated.

Investigations of "lime base" muds have revealed that the most desirable muds are obtained when the calcium concentration in the liquid phase is approximately 200 parts per million. By replacing the lime with calcium carbonate or an equivalent alkaline earth metal compound as indicated above, a saturated solution at the temperature and pH conditions encountered is somewhat less than 200 p. p. m. and the subsequent fluid more desirable.

Alternatively, in lieu of adding calcium carbonate as above described, a limited amount of lime may first be added to the mud to be converted, it being understood that the amount is less than that required to effect total conversion of the mud. Subsequently, an excess of calcium carbonate is added in an amount sufficient to complete the conversion of the mud and to provide a reservoir of calcium ions.

As a specific example of a practical application of the invention, a certain well was drilled to a depth of about 5,000 ft. with a conventional clay mud, most of the mud having been acquired during drilling and having no special treatment. On reaching 5,000 feet, the mud was treated as outlined below over a 17-hour period. In the treatment, 10 lbs. per barrel of calcium carbonate in the form of ground oyster shells and 1 lb. per barrel of quebracho was added to the system. After 5 hours, no appreciable change in the mud characteristics was noted. The pH of the mud at this time was between 7 and 8.

Then ⅙ lb. per barrel of caustic was added to the system. Within one hour the gel of the mud was appreciably reduced and 10 hours later the pH of the mud was between 8.5 and 9.5, the gel strength being even further reduced. An additional ⅙ lb. per barrel of caustic was added. After one hour there was no substantial change in pH and the gel strength had been reduced to 0–0 as compared to 12–18 for the original mud, the tests of gel strength being made on the shearometer in the manner described on page 6 of Recommended Practice for Standard Field Procedure for Testing Drilling Fluids (Tentative), 3rd ed., issued by American Petroleum Institute, Division of Production, Dallas, Texas, May, 1950.

An addition 20 lbs. per barrel of calcium carbonate and ⅙ lb. per barrel of caustic was then added to the mud and was not found to alter its characteristics.

After the above initial treatment, conventional mud treatment of quebracho, caustic and "High Yield Clay," a trade name of a typical mud clay, was used for the next twelve days during which the mud exhibited excellent characteristics and ranged in pH from 9 to 10, the calcium in reserve acting as a control.

As a result of the use of calcium carbonate as above described in this particular well, 800 barrels of mud were made during the first twelve days after treatment compared to an estimated 500 to 600 barrels per day with conventional treatment and the cost of treatment per day was reduced from $100 to $30–$40. There was less difficulty from sticky shales, the cuttings obtained were clean and no difficulty was met in making trips with the drill pipe. The drilling time was above average.

In another well, a disintegrating shale was encountered at 8500 feet, a lime starch mud having a pH of 12.5 being used up to that depth. There was also considerable undesirable water loss. The addition of clay and starch increased the viscosity of the mud to 110 seconds as determined by the A. P. I. Marsh funnel test and the water loss characteristics were unsatisfactory.

At about 9,000 feet, 22 lbs. per barrel of calcium carbonate was added to the mud system. The viscosity was reduced to 60 seconds and the desired water loss characteristics obtained. Drilling through the shale was maintained without any increase in viscosity and it was found very easy to control the mud.

It was estimated that the addition of calcium carbonate in this well reduced the cost of mud treatment by 50%. In addition, there was not sufficient colloidal increase in the mud during drilling to require the addition of excess water.

From the foregoing, it is believed evident that alkaline earth metal compounds of the type described, as exemplified by shell flour, are effective mud treating chemicals. They are particularly effective in retarding the accumulation of colloidal shales, thus preventing the accumulation of any excess mud and reducing the difficulty of drilling through troublesome shale. In addition, they provide a mud of good viscosity and gel characteristics which are unusually stable and can be maintained with little maintenance and attention, this follwing by reason of the excess of material that can be maintained by way of a reservoir.

Such materials as calcium carbonate are much cheaper than the hitherto used lime, are less hazardous, and have been found to reduce water loss in contrast to lime which increases water loss.

Obviously many modifications and variations of the invention, as hereinbefore set forth, may be made without departing from the spirit and scope thereof and, therefore, only such limitations should be imposed as are indicated in the appended claims.

This application is a continuation-in-part of my copending patent application Serial No. 396,787 filed December 7, 1953, which in turn is a continuation-in-part of my copending patent application Serial No. 182,619 filed August 31, 1950, both now abandoned.

I claim:

1. A method of converting an aqueous alkali metal base clay-containing drilling fluid to a drilling fluid characterized by an alkaline earth metal base without effecting undesirable flocculation of said fluid comprising the steps of establishing and maintaining said alkali metal base drilling fluid at a pH in the alkaline range and adding an alkaline earth metal-containing compound in excess of the amount theoretically required to convert said fluid, said compound being characterized by a negative ion compatible with said fluid and having a solubility in said fluid when measured at 20° C. less than that of lime and more than that of calcium oxalate.

2. A method according to claim 1 wherein said alkaline earth metal-containing compound is magnesium hydroxide.

3. A method of converting an aqueous alkali metal base clay-containing drilling fluid to a drilling fluid characterized by an alkaline earth metal base without effecting undesirable flocculation of said fluid comprising the steps of establishing and maintaining said alkali metal base drilling fluid at a pH in the alkaline range and adding a calcium-containing compound in excess of the amount theoretically required to convert said fluid, said compound being characterized by a negative ion compatible with said fluid and having a solubility when measured at 20° C. less than that of lime and more than that of calcium oxalate.

4. A method of converting an aqueous alkali metal base clay-containing drilling fluid to a drilling fluid characterized by an alkaline earth metal base without effecting undesirable flocculation of said fluid comprising the steps of establishing and maintaining said alkali metal base drilling fluid at a pH in the alkaline range and adding calcium carbonate in excess of the amount theoretically required to convert said fluid.

5. A method of converting an aqueous alkali metal base clay-containing drilling fluid to a drilling fluid having an alkaline earth metal base without causing undesirable flocculation of said fluid comprising the steps of establishing and maintaining said alkali metal base drilling fluid at a pH in the alkaline range, adding lime in an amount less than that theoretically required to convert said fluid and in an amount less than that necessary to cause undesirable flocculation, and adding an alkaline earth metal-containing compound in excess of that additionally theoretically required to convert said fluid, said compound being characterized by a negative ion compatible with said fluid and a solubility in said fluid when measured at 20° C. less than that of lime and more than that of calcium oxalate.

6. A method of converting an aqueous alkali metal base clay-containing drilling fluid to a drilling fluid having an alkaline earth metal base without causing undesirable flocculation of said fluid comprising the steps of establishing and maintaining said alkali metal base drilling fluid at a pH in the alkaline range, adding lime in an amount less than that theoretically required to convert said fluid and in an amount less than that required to produce undesirable flocculation and adding a calcium-containing compound in excess of the amount additionally required theoretically to convert said fluid, said compound being characterized by a negative ion compatible with said fluid and a solubility in said fluid when measured at 20° C. less than that of lime and more than that of calcium oxalate.

7. A method of converting an aqueous alkali metal base clay-containing drilling fluid to a drilling fluid having an alkaline earth metal base without causing undesirable flocculation of said fluid comprising the steps of establishing and maintaining said alkali metal base drilling fluid at a pH in the alkaline range, adding lime in an amount less than that theoretically required to convert said fluid and in an amount less than that required to produce undesirable flocculation and adding calcium carbonate in an amount in excess theoretically of that required to convert said fluid.

8. A method according to claim 7 wherein said calcium carbonate is in the form of finely ground oyster shells.

9. In the preparation of an aqueous drilling fluid containing suspended clay for drilling subsurface formations which tend to disperse therein and form excessive quantities of mud-making colloids, the improvement which comprises treating said fluid to provide an alkaline earth metal base product having a substantial stabilizing effect upon the said subsurface formation to suppress the liberation of said mud-making colloids, by adding an alkali metal base to establish and maintain a pH in the alkaline range and admixing therewith an alkaline earth metal compound characterized by a negative ion compatible with said drilling fluid and having a solubility in said drilling fluid less when measured at 20° C. than that of lime and greater than that of calcium oxalate, said compound being in substantial excess over the amount dissolved by said drilling fluid.

10. A method according to claim 9 wherein said alkaline earth metal compound is a calcium compound.

11. A method according to claim 9 wherein said alkaline earth metal compound is calcium carbonate.

12. A method according to claim 11 wherein said calcium carbonate is in the form of ground oyster shells.

13. In a process for drilling a well with well drilling tools wherein there is circulated in the well a water base drilling mud containing colloidal particles of clayey material suspended in sufficient water to render the same circulatable, the method of suppressing "mud-making" in drilling subsurface formations which tend to disperse in the mud by forming excessive quantities of mud-making colloids therewith, which comprises establishing and maintaining a pH in the alkaline range in said drilling mud by the addition of an alkali metal base and adding to said mud an alkaline earth metal-containing compound characterized by a negative ion compatible with said mud and having a solubility in said drilling fluid less than that of lime and more than that of calcium oxalate, said alkaline earth metal containing compound being added in substantial excess over the amount soluble in said mud to continuously stabilize the subsurface formation against dispersion in the mud, and contacting the wall of said well with the resulting drilling mud.

14. A method according to claim 13 wherein said alkaline earth metal-containing compound is calcium carbonate.

15. A method according to claim 14 wherein said calcium carbonate is added in the form of ground oyster shells.

16. A method of converting an aqueous alkali metal base clay-containing drilling fluid to a drilling fluid characterized by an alkaline earth metal base without effecting undesirable flocculation of said fluid comprising the steps of establishing and maintaining said drilling fluid at a pH in the alkaline range and adding calcium carbonate to said fluid in an amount in excess of that theoretically required to convert said fluid.

17. A method of claim 16 wherein said calcium carbonate is in the form of finely ground oyster shells.

18. A method of converting an aqueous alkali metal base clay-containing drilling fluid to a drilling fluid characterized by an alkaline earth metal base without effecting flocculation of said fluid comprising the steps of establishing and maintaining said alkali metal base drilling fluid at a pH in the alkaline range and adding an alkaline earth metal containing compound in excess of the amount theoretically required to convert said fluid, said compound being characterized as possessing a negative ion compatible with said fluid and having a solubility in said fluid less than that of lime and more than that of calcium oxalate.

References Cited in the file of this patent

UNITED STATES PATENTS

| | | |
|---|---|---|
| 2,198,563 | Robinson | Apr. 23, 1940 |
| 2,233,867 | Howe | Mar. 4, 1941 |
| 2,529,760 | Bergman | Nov. 14, 1950 |
| 2,584,768 | Weiss | Feb. 5, 1952 |